United States Patent Office 2,727,880
Patented Dec. 20, 1955

2,727,880

ORGANO-SILICON COMPOUNDS FROM ACETONE AND TRICHLOROSILANE

Robert N. Hazelwood, Milwaukee, Wis., assignor to McGraw Electric Company, Milwaukee, Wis., a corporation of Delaware No Drawing. Application January 22, 1953,
Serial No. 332,755

30 Claims. (Cl. 260—46.5)

The present invention relates to the production, hydrolysis and co-hydrolysis of organo-silicon compounds.

It is an object of the present invention to prepare silicon compounds from the reaction of a carbonyl compound, such as acetone, and a halogenosilane, such as trichlorosilane.

It is another object of this invention to prepare a silicon compound from a carbonyl compound and a halogenosilane, in which preparation the reaction may be promoted by the addition of a small amount of an alcohol, such as amyl alcohol.

It is a further object of this invention to prepare siloxanes by hydrolysis of the reaction product of a carbonyl compound and a halogenosilane.

It is still another object of this invention to prepare co-hydrolysis polymeric compounds in which at least one ingredient comprises the reaction product of a halogenosilane and a carbonyl compound.

The reaction of chloroform and acetone in the presence of an alkali to provide the familiar "chloretone" product, which is correctly named 1,1,1-trichloro-tert-butyl alcohol, has long been known in organic chemistry. I have found that a comparable reaction may be produced in the field of silicon chemistry. However, it is to be noted that though the reaction is quite analogous, it would not be possible to anticipate it by the use of comparable materials. That is, for one thing, alkaline catalysts can not be used because they react with the Si-H bond.

In addition, the halogenosilane is much more versatile in its reactions with the carbonyl group than is chloroform. It is known that chloroform will react only with alpha substituted aldehydes and will not react at all with benzophenone. I have found that with every ketone tested, the halogenosilane will react. The following is a representative list of carbonyl compounds which have been found to react: Acetone, methyl n-amyl ketone, diethyl ketone, methyl ethyl ketone, acetylacetone, acetophenone, propiophenone, 1-aceto naphthone, benzophenone, quinone, camphor, acetaldehyde, furfural, and benzoyl chloride.

Trichlorosilane, for example, may be said to react with acetone in a manner analogous to the "chloretone" reaction:

(1) 

(2) 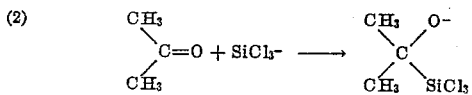

The molecules produced will condense to high polymers. Therefore, they will ultimately gel, being trifunctional in nature:

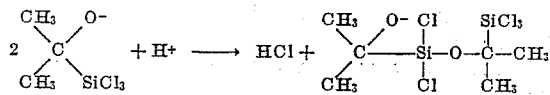

In every case where trichlorosilane reacted with the carbonyl compound, a gel was obtained. As is customary with high polymers, a portion of the gel remained soluble in organic solvents immediately after gelling, and became progressively insoluble as the reaction continued, until finally only about 2% of the gel was soluble in polar organic solvents.

These reactions were run both with and without solvents, as well as in the light and in the dark. Ionizing solvents such as nitrobenzene increase the reaction rate appreciably. Illumination produced no appreciable difference in the rate. From all of the above, it is felt that this is a case of nucleophilic attack by trichlorosilane upon the carbonyl group via a bimolecular second order reaction.

It was also found that by adding alcohol, for instance, amyl, ethyl or methyl alcohol, to the mixture, an increase in speed of the order of 150 to 1 was observed.

Like all compounds containing C-O-Si bonds, these materials will hydrolize to form Si-O-Si bonds. In this case, one obtains liquid polymers which are of low molecular weight, which will readily wet glass and metals, and which are converted to solids only by vigorous treatment.

Hydrolysis of the gels proceeds slowly in acid and neutral solutions, but is quite rapid in 5% ammonia. One would expect to obtain solid polymers upon hydrolysis of a trifunctional silane under the conditions used in the reaction. However, even under rather strenuous conditions, only viscous liquids are produced. Heating at 150° C. for 20 hours in air produced a viscous liquid polymer of number average molecular weight of 1560. Only after continued heating for over 30 hours at 150° C. could the low molecular weight siloxane be solidified. Treatment with concentrated H₂SO₄ and heating for 4 hours at 90° C. gives a solid glassy resin similar to, but not the same as, the solid obtained by heating in air without catalysts. The low molecular weight liquid did not solidify in air at room temperature over a 9 month period. If the liquid is treated with concentrated H₂SO₄, allowed to stand for 10 minutes, then washed with water, it will produce a viscous liquid in a few hours, and this can readily be solidified by heating.

The reactions of trichlorosilane are surprisingly different from those of the carbon analog, chloroform. This emphasizes the danger of attempting to predict the behavior of the silane derivatives merely from the knowledge of the corresponding carbon compounds.

In order that it may be better understood how the present invention may be carried into effect, the following examples are given illustrating the preparation of the reaction product of various halogenosilanes and of various carbonyl compounds:

Example 1

An Erlenmeyer flask was charged with 135.5 grams of trichlorosilane and 85 grams of acetone. The reaction was allowed to proceed at room temperature in the stoppered flask. Hydrogen chloride formed by the reaction was periodically vented. After approximately 200 hours a red glassy solid had formed. There was also about 20 cc. of a dark red liquid in the flask, which later solidified. Apparently, this liquid was the sol portion of the reaction product. The absorption maximum in benzene of this sol was 488 milli-microns, and the gram extinction coefficient was 0.176.

Example 2

The same amount of trichlorosilane and acetone as used in Example 1 was charged to an Erlenmeyer flask, except that an addition of 10 grams of normal amyl alcohol was added dropwise to the reaction. When the reaction of the alcohol and the silane had ceased, the flask was stoppered and the reaction was allowed to proceed as in Example 1. The hydrogen chloride was vented periodically. A red glassy solid was formed, but it is to be noted that this formation took place at approximately 72 hours.

*Example 3*

The ingredients of Example 1 were again charged to a flask, except that 5 grams of methyl alcohol was added dropwise. Again the glassy formation took place, but occurred after an elapsed time of approximately 70 hours. The absorption maximum in benzene of the solid formed in both Examples 2 and 3, as well as the gram extinction coefficient, indicated no differentiation from that of the solid formed in the reaction of Example 1.

*Example 4*

135.5 grams of trichlorosilane and 120 grams of acetophenone were reacted with one another in the presence of a dropwise addition of 5 grams of amyl alcohol under conditions substantially identical to the heretofore described examples. In this case the solid formation was completed in approximately 80 hours, and was of a yellow color. The absorption maximum in benzene was 520 milli-microns.

*Example 5*

An Erlenmeyer flask was charged with 13.6 grams of trichlorosilane and 100.0 grams of acetylacetone (2,4-pentadione). The reaction was allowed to proceed at room temperature with a dropwise addition of 5 grams of ethyl alcohol. A deep red solid was formed within approximately 6 hours. The absorption maximum of this solid was 480 milli-microns.

*Example 6*

13.6 grams of trichlorosilane and 72.0 grams of methyl ethyl ketone were charged to a stoppered flask with a dropwise addition of 5 grams of n-butyl alcohol. After an elapsed time of approximately 24 hours a red solid was formed having an absorption maximum of 477 milli-microns.

*Example 7*

27.0 grams of 1-acetonaphthone and 1.4 grams of trichlorosilane were reacted in the presence of a dropwise addition of 0.5 gram of amyl alcohol. A blood red solid was formed after an elapsed time of 24 hours. This solid had an absorption maximum in benzene of 341 milli-microns.

An example of the hydrolysis reaction of the carbonyl-halogenosilane reaction products may be illustrated as follows:

*Example 8*

50 grams of the material produced by the reaction described in Example 2, above, was placed in a two liter beaker with one liter of 5% ammonium hydroxide solution, the latter being added with vigorous stirring. A red oil floated to the surface and a white, gel-like, solid precipitated out. The red oil was extracted with benzene. The aqueous portion was filtered, and the precipitate was washed. Both the filtrate and the precipitate were each extracted with benzene. The benzene extracts were combined. The precipitate was identified as silicon dioxide. The benzene extract was strip distilled at atmosphere pressure, followed by heating at 22 mm. Hg. and 80° C. for 15 minutes. A red oil was obtained. The yield, based on silicon, was 47.9% overall. The percentage of silicon in the red oil was 25.35%. The absorption maximum in benzene of the red oil was 357 milli-microns, and the molecular weight (cryoscopic) was 206. The molar extinction coefficient was 214.8. The infrared spectrum of a thin film of this red oil showed the presence of silicon-carbon and silicon-oxygen bonds. The red oil solidified on strong heating to a brittle red glass. However, heating at 155° C. in air for 24 hours produced only a viscous liquid having a molecular weight of 1560.

It appears that solid materials formed from the basic reaction of the carbonyl compound and the halogenosilane would have use as coatings, films and resins. This may be borne out from the following examples, in which various copolymeric siloxanes are formed:

*Example 9*

A weighed quantity of the acetone-trichlorosilane product (20 grams) was placed in a beaker with 19 grams of vinyl triethoxysilane. 400 grams of 5% ammonium hydroxide solution was added. The product was crushed and stirred with a glass rod to form a paste. The stirring was continued until all evidence of hydrolysis had ceased. The batch was extracted with ether, the ether layer decanted off, and the mixture remaining filtered. The precipitate was washed three times with 20 cc. batches of ether. The washings were combined with the extract and placed in a distilling flask. The co-polymer was strip distilled. The residue in the flask after distilling was painted on copper wire and cured in the air or in an oven until set. It was found that any ratio from 0.2 to 5 parts of the reaction product of trichlorosilane and acetone per one part of vinyl triethoxysilane gave suitable coatings. On soft copper wire of approximately 3/32" diameter, cured for 5 hours at 90° C., these coatings remained flexible until the copper wire failed.

*Example 10*

The hydrolysis product of 13 grams of dimethyl dichlorosilane and 20 grams of the reaction product of acetone and trichlorosilane formed a solid polymer on treatment with sulfuric acid after extraction. The preparation and extraction procedure used was as taught in connection with Example 9.

*Example 11*

20 grams of the reaction product of acetone and trichlorosilane and 19 grams of vinyl triethoxysilane and 40 g. of dimethyl dichlorosilane were reacted as described in the procedure of Example 9 and cured in an oven to form a solid co-polymer.

*Example 12*

A heat convertible solid which had excellent temperature resistance was formed from 20 grams of the reaction product of acetone and trichlorosilane and 48 grams of phenyl trichlorosilane. The reaction procedure used was as taught in connection with Example 9.

I claim:

1. The method of preparing a polymeric material which comprises admixing at ambient temperature trichlorosilane and acetone in a 1–1.5 molar ratio, respectively, and permitting the said two materials to react in admixture until a gel-like solid is formed.

2. The hydrolysis of the gel-like solid produced by the method of claim 1 in a dilute solution of ammonium hydroxide.

3. The method of preparing a polymeric material which comprises admixing at ambient temperature trichlorosilane and a ketone and permitting the said two materials to react in admixture with an alkyl alcohol until a gel-like solid is formed.

4. The method of claim 3 wherein the ketone is selected from the group consisting of dialkyl ketones, alkyl aryl ketones, diaryl ketones and cyclic ketones.

5. The method of claim 3 wherein the ketone is acetone.

6. The method of claim 3 wherein the ketone is methyl ethyl ketone.

7. The method of claim 3 wherein the ketone is acetophenone.

8. The method of claim 3 wherein the ketone is 1-acetonaphthone.

9. The method of claim 3 wherein the alkyl alcohol is methyl alcohol.

10. The method of claim 3 wherein the alkyl alcohol is ethyl alcohol.

11. The method of claim 3 wherein the alkyl alcohol is butyl alcohol.

12. The method of claim 3 wherein the alkyl alcohol is amyl alcohol.

13. The hydrolysis of the gel-like solid produced by the method of claim 3 in a dilute solution of ammonium hydroxide.

14. The hydrolysis of the gel-like solid produced by the method of claim 4 in a dilute solution of ammonium hydroxide.

15. The hydrolysis of the gel-like solid produced by the method of claim 5 in a dilute solution of ammonium hydroxide.

16. The hydrolysis of the gel-like solid produced by the method of claim 6 in a dilute solution of ammonium hydroxide.

17. The hydrolysis of the gel-like solid produced by the method of claim 7 in a dilute solution of ammonium hydroxide.

18. The hydrolysis of the gel-like solid produced by the method of claim 8 in a dilute solution of ammonium hydroxide.

19. The hydrolysis of the gel-like solid produced by the method of claim 9 in a dilute solution of ammonium hydroxide.

20. The hydrolysis of the gel-like solid produced by the method of claim 10 in a dilute solution of ammonium hydroxide.

21. The hydrolysis of the gel-like solid produced by the method of claim 11 in a dilute solution of ammonium hydroxide.

22. The hydrolysis of the gel-like solid produced by the method of claim 12 in a dilute solution of ammonium hydroxide.

23. The co-hydrolysis of the product produced by the the method of claim 1 and vinyl triethoxysilane.

24. The co-hydrolysis of the product produced by the method of claim 1 and dimethyl dichlorosilane.

25. The co-hydrolysis of the product produced by the method of claim 1, vinyl triethoxysilane and dimethyl dichlorosilane.

26. The co-hydrolysis of the product produced by the method of claim 1 and phenyl trichlorosilane.

27. The product of co-hydrolysis of vinyl triethoxysilane and the product of claim 1.

28. The product of co-hydrolysis of dimethyl dichlorosilane and the product of claim 1.

29. The product of co-hydrolysis of vinyl triethoxysilane, dimethyl dichlorosilane and the product of claim 1.

30. The product of co-hydrolysis of phenyl trichlorosilane and the product of claim 1.

References Cited in the file of this patent

UNITED STATES PATENTS

| | | |
|---|---|---|
| 2,533,240 | Goldblatt et al. | Dec. 12, 1950 |
| 2,537,073 | Mackenzie et al. | Jan. 9, 1951 |
| 2,637,718 | Rust | May 5, 1953 |

OTHER REFERENCES

Dilthey: Berichte Deut. Chem. Gesel., vol. 36, 1903, pages 923, 926, and 927.